Oct. 4, 1966 T. J. HOFBAUER 3,276,716

EASY THREADING TAPE REEL

Filed Aug. 28, 1964 2 Sheets-Sheet 1

Thomas J. Hofbauer
INVENTOR.

BY

ATTORNEY

Oct. 4, 1966 T. J. HOFBAUER 3,276,716

EASY THREADING TAPE REEL

Filed Aug. 28, 1964 2 Sheets-Sheet 2

Thomas J. Hofbauer
INVENTOR.

BY

ATTORNEY

United States Patent Office 3,276,716

Patented Oct. 4, 1966

3,276,716

EASY THREADING TAPE REEL

Thomas J. Hofbauer, 48 Lake Trail E., Wayne, N.J.

Filed Aug. 28, 1964, Ser. No. 392,802
6 Claims. (Cl. 242—74)

This invention relates to open end tape reels and in particular to an easy threading tape reel.

Flexible tapes are presently used extensively in various applications such as sound recordings, computer magnetic units, motion picture films and the like. In all these applications, the flexible tape is stored, utilizing reels having two flanges extending around a central hub upon which the tape is wound; the tape being unwound when it is used. A problem arises when a tape is to be wound on a reel in that starting the winding process necessitates an initial fixation of the tape to the reel. Therefore in order to facilitate winding the reel flanges have openings therein near the hub so as to accommodate the insertion of fingers so as to grasp the tape and hold it against the hub during the initial winding of the tape. Even with the openings in the flange a certain amount of dexterity is needed and winding the first several turns is arduous and time consuming.

To alleviate the problem, various methods have been devised. One method utilizes a slit through one of the flanges extending into the hub. The end of the tape is inserted through the slit and bent in the interior of the hub, after which the reel is turned several turns by hand. As can readily be seen, this method is time consuming.

Another method has been devised wherein the end of the tape contains a magnetic material and the reel hub contains a magnet. The end of the reel is inserted between the flanges until it reaches the vicinity of the magnet in the hub. Through the phenomenon of magnetism, the end of the tape is then attracted to, and becomes affixed to, the magnet. The disadvantages of this method are that it requires an adaptation of the end of the tape if the latter is non-magnetic, or it has a deleterious effect on the signals carried in the initial loops if the tape is magnetic.

It is an object of the present invention to provide a tape reel which permits the winding of the initial portion of the tape speedily without first attaching the end portion of the tape to the hub of the reel as in previous methods set forth above.

Another object of the present invention is to provide a tape reel with holding means so that the initial winding of the tape can easily be done without creasing, ripping or otherwise deleteriously affecting the tape.

The present invention comprises a tape reel having two flanges extending from both ends of a central hub, and holding means located on the interior sides of said flanges adjacent said hub whereby the initial turns of the tape wound around said hub are held after contact has been made between the tape and said holding means.

The invention, both as to its construction and method of operation, together with additional objects and advantages thereof, will best be understood from the following description when read in connection with the accompanying drawings in which.

Figure 1:
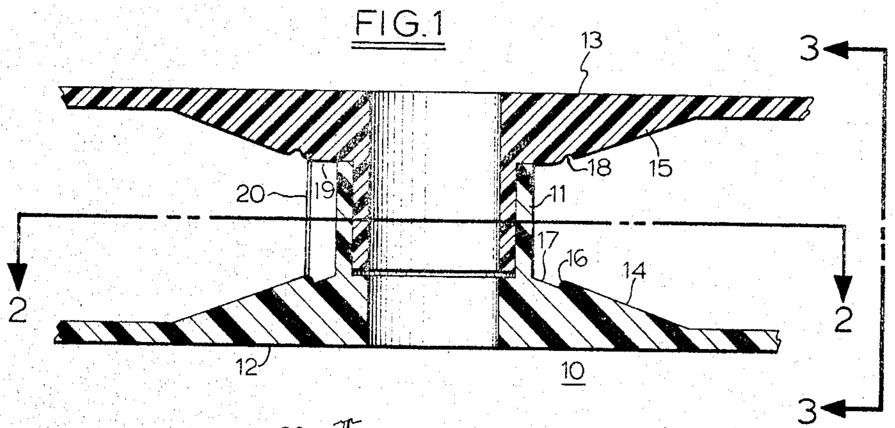
FIGURE 1 is a sectional view in elevation of the preferred embodiment of the invention with a portion of the tape.
Figure 2:
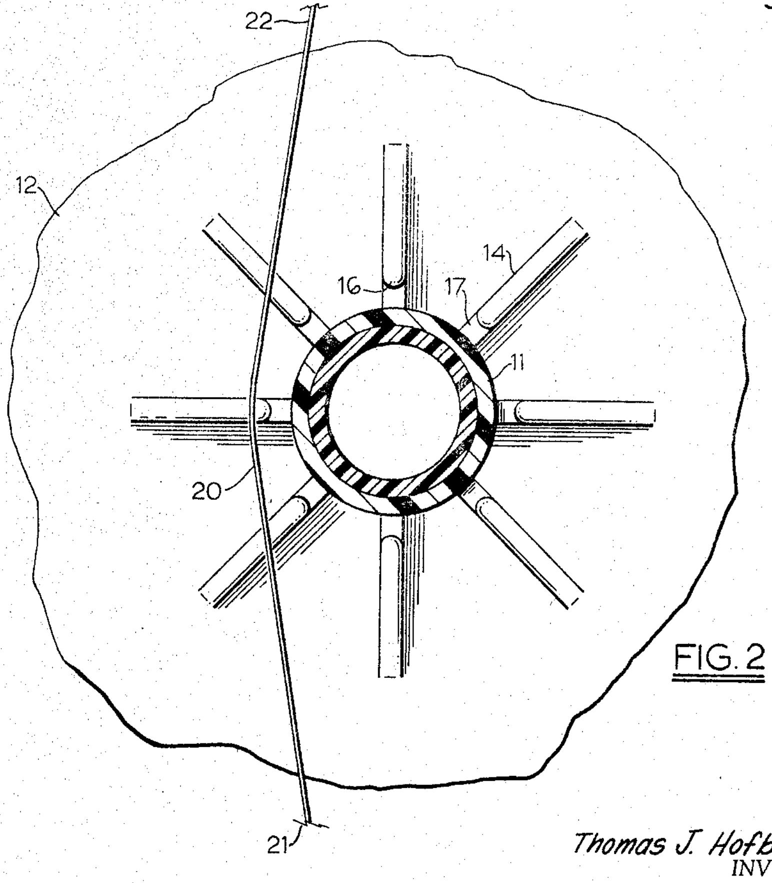
FIGURE 2 is a sectional plan view of the preferred embodiment, the section being taken along the line 2—2 of FIGURE 1.
Figure 3:
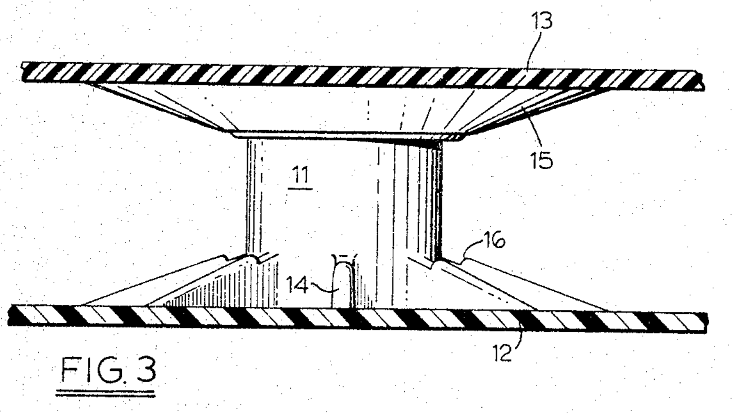
FIGURE 3 is an elevational view, partly in section, of the preferred embodiment.

Referring now to the drawings, the preferred embodiment comprises a reel 10 having a hub 11, a bottom flange 12 connected to the bottom of the hub 11 and top flange 13 connected to the top of the hub 11.

A series of radially oriented wedges 14 are located on the interior side of the bottom flange 12 and preferably, but not necessarily, are molded as one piece with the flange. Spatially disposed in cooperative relationship with the wedges 14 is a slanted surface 15 surrounding the hub and located on the interior side of flange 13. The slanted surface is likewise preferably, but not necessarily, molded as one piece with flange 13. While surface 15 is shown slanted it is not necessary to the invention that it be slanted, it may be parallel to and an extension of the flange 13. Wedges 14 and slanted surface 15 in combination act to decrease the width between the flanges 12 and 13 as the hub 11 is approached. At a distance from the hub 11 of several times the thickness of the tape for which the reel 10 is intended to be used, wedge 14 has a rounded step 16 and from the step 16 to the hub 11 a notch 17, which has a slanted base. Extending radially inward from slanted surface 15 to the hub is a horizontal flat section 19. Situated between the slanted surface and the flat section is an annular depression 18 which is directly opposite the step 16. For the purpose of a clearer understanding of the invention, the sizes of wedges 14 and the slanted surface 15 and the flat section 19 have been greatly exaggerated in the drawings. Actually, their dimensions are measured in fractions of an inch.

The distance between the interior surfaces of the flanges 12 and 13 at any distance from the hub 11 other than at the wedges 14 and the slanted surface 15 is made slightly larger than the width of the tape 20 for which the reel is intended. At a point along the wedges 14 and the slanted surface 15 just before the depression 18, the distance between the facing surfaces of the wedges 14 and the slanted surface 15 is equal to or barely greater than the width of the tape 20. Thereafter, continuing radially toward the hub 11, the vertical distance between the facing surfaces of the wedges 14 and flat section 19 is maintained slightly less than the width of the tape 20.

Figure 4:
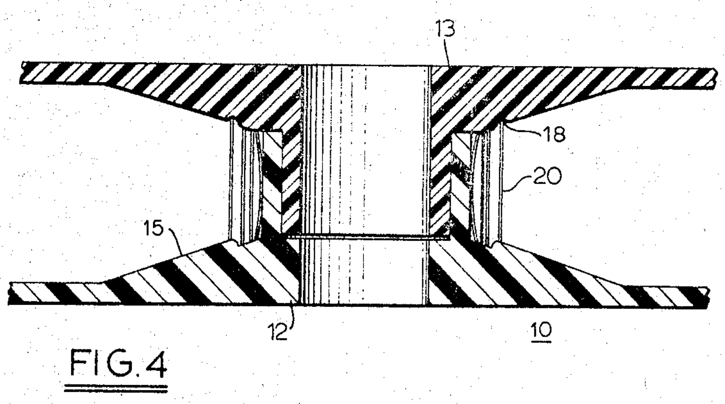
FIGURE 4 is a side elevational view showing the initial turns of the tape when wound in accordance with the present invention.

To initiate winding the tape it is not necessary for the operator to insert his finger between the reel flanges nor is it necessary to have openings in the reel flanges for inserting the operator's fingers to initiate winding the tape. The operator merely grasps the end 21 of tape 20 in one hand and some other point 22 of the tape 20 in the other and then inserts that portion of tape 20 between the end 21 and the point 22 through the area between the wedges 14 and the slanted surface 15 by pulling the tape toward the hub 11. He continues this motion until the tape 20 becomes caught between the wedges 14 and the slanted surface 15 as shown in FIGURE 1. At this point the friction between the faces of the wedges and the annular member and the sides of the tape 20 is sufficient to allow the machine winding of the remainder of the tape 20 but is not yet sufficient to bar sliding motion of the tape 20 with respect to the wedges 14 and slanted surface 15. As the winding starts, the initial pulling force on the tape 20 forces it to slide helically inward toward the hub past the depression 18, over the step 16 and along the notch 17 and the horizontal flat section 19 until it abuts the hub 11. Since the distance between the wedges 14 and the flat section 19 is still less than the width of the tape 20 at this point, the initial turns of the tape are slightly curved, taking the shape indicated in FIGURE 4. The curvature however, is slight and has no permanent effect on the tape 20, since the latter is never distorted beyond its elastic limit. The step 16 and the notch 17 cooperate to offer resistance to annular and radially slippage of the tape. When the initial turn of the tape 20 first abuts the hub 11, the friction between the hub 11 and the tape 20 due to the additional turns of tape 20 around the initial turn becomes greater and causes the tape 20 to discontinue motion with respect to the hub 11 and the tape 20 is then firmly in place.

In unwinding the tape 20 from the reel 10, these same initial turns are peeled from the reel. No distortion nor disfigurement of the tape 20 results however, because, in this reverse process, the depression 18 enables the tape 20 (as it does in the winding of the tape 20), to easily slide over the step 16 which, with its rounded corners, does not catch the tape 20 nor forcefully prevent its sliding in any way.

As can readily be seen the preferred embodiment of the invention provides for quick and simple affixation of the tape 20 to the reel 10. Only one step is necessitated, that of grabbing the tape 20 and forcing it in toward the hub 11. From that point onward, the configuration of the wedges allows the immediate machine winding of the tape 20 on the reel 10 which in turn properly positions the tape 20 around the hub 11. No hand turning of the reel 10 is needed. No threading of the tape 20 is required. Further, the use of the invention does not cause the ripping or disfigurement of the initial turns of the tape 20 so prevelant with the use of other easy threading tape reels.

The invention is not limited to the use of wedges alone since the cross-section shown in FIGURE 1 could be made continuous around the hub 11, the wedges 14 thereby becoming a ring. Similarly the number of wedges 14 may be varied to suit the particular application intended.

Additionally, it should be noted that the invention also encompasses using the upper reel flange without the slanted surface 15, so long as the depression 18 is positioned in the upper reel flange opposite the step 16 on wedges 14.

In any event, it can readily be seen that the construction of the reel, embodying the invention is extremely simple and inexpensive. At present, reels are fabricated by molding opposite flanges and then joining them as shown in FIGURE 1. The practice of the present invention necessitates only a change in the mold of the flanges. Once the flanges have been molded, the fabrication process is exactly the same as at present. There is no different material introduced, the reel being composed of the same material throughout. No riveting, glueing or other affixation of material is necessary, resulting in increased life and efficiency of the reel. Also, it is possible to mold the complete reel, embodying the invention in one piece.

Although the present invention has been herein described in specific form, it will be apparent to those skilled in the art that many modifications are possible within the spirit and scope of the present invention. The invention is intended to encompass all such modifications as fall within the scope of the following claims.

What I claim is:

1. A reel comprising a hub, a pair of flanges connected to said hub and having means for holding a tape, said means comprising a slanted surface on one flange and at least one wedge shaped means on the other flange said slanted surface cooperating with said wedge shaped means for holding a tape upon initial winding.

2. A reel in accordance with claim 1, wherein said slanted surface has formed therein a depression, said wedge shaped member having a notch cooperating with said depression to permit easy access of a tape to said notch.

3. A reel in accordance with claim 1, wherein said depression is annular about said hub.

4. A reel in accordance with claim 2 wherein the base of said notch ends in a shoulder to prevent radial slippage of the tape.

5. A reel comprising a hub, a pair of flanges connected to said hub, and means adjacent to said hub for holding a tape, said means comprising a wedge shaped member projecting from the hub said wedge shaped member having a notch, and a flat surface projecting from the hub spatially opposite said notch, said notch and said flat surface cooperating to hold the tape upon initial winding.

6. A reel in accordance with claim 5 wherein said notch has a shoulder and said flat surface has a depression, said shoulder and said depression cooperating to permit easy access of the tape to said tape holding means.

References Cited by the Examiner

UNITED STATES PATENTS

| | | | |
|---|---|---|---|
| 1,942,186 | 1/1934 | Ross | 242—74 |
| 2,226,825 | 12/1940 | McCawley | 242—74 |

FRANK J. COHEN, *Primary Examiner.*

MERVIN STEIN, N. L. MINTZ, *Examiners.*